(No Model.) 2 Sheets—Sheet 1.
R. CONDON.
HARNESS.
No. 485,258. Patented Nov. 1, 1892.
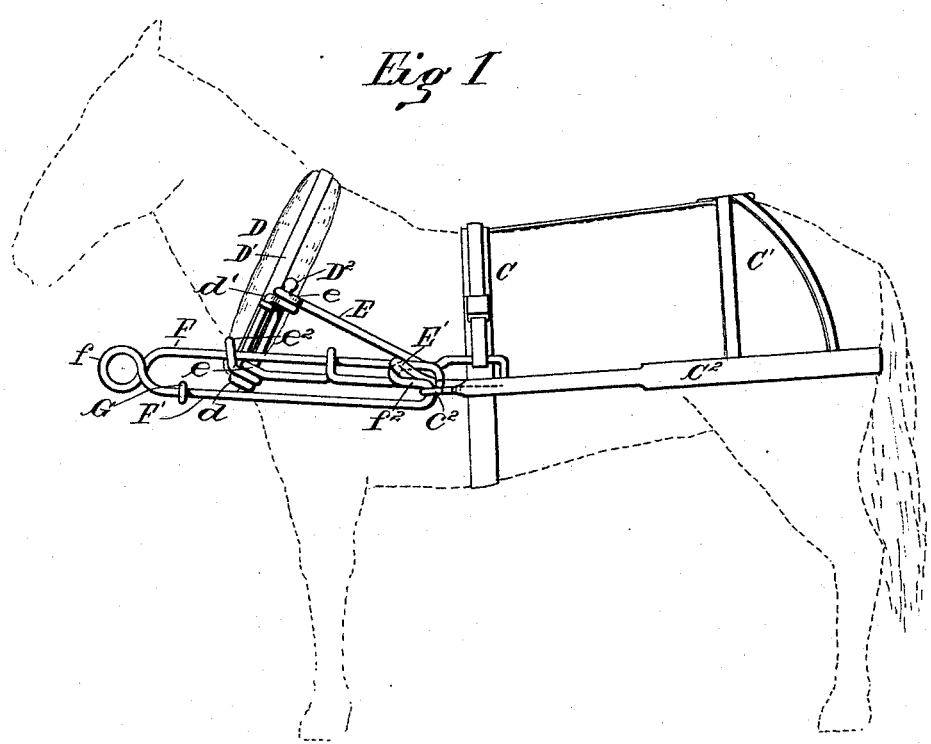
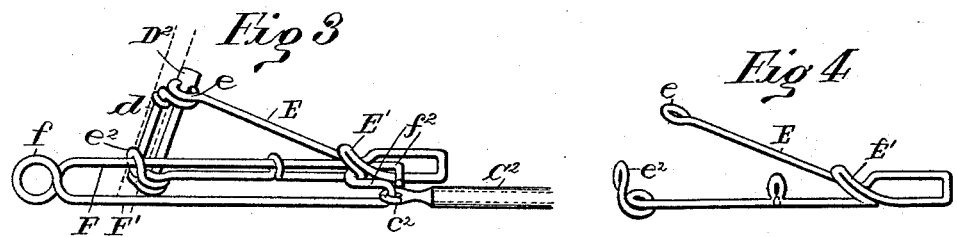
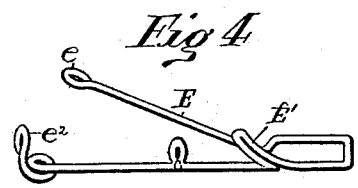
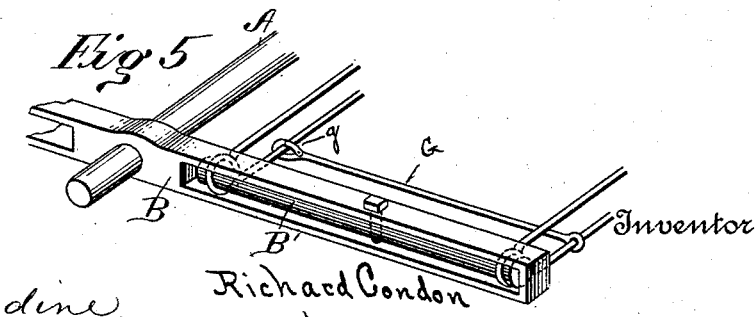
Witnesses
C. C. Burdine
A. L. Watson
Inventor
Richard Condon
by
Crosby and Dorian, his Attorneys

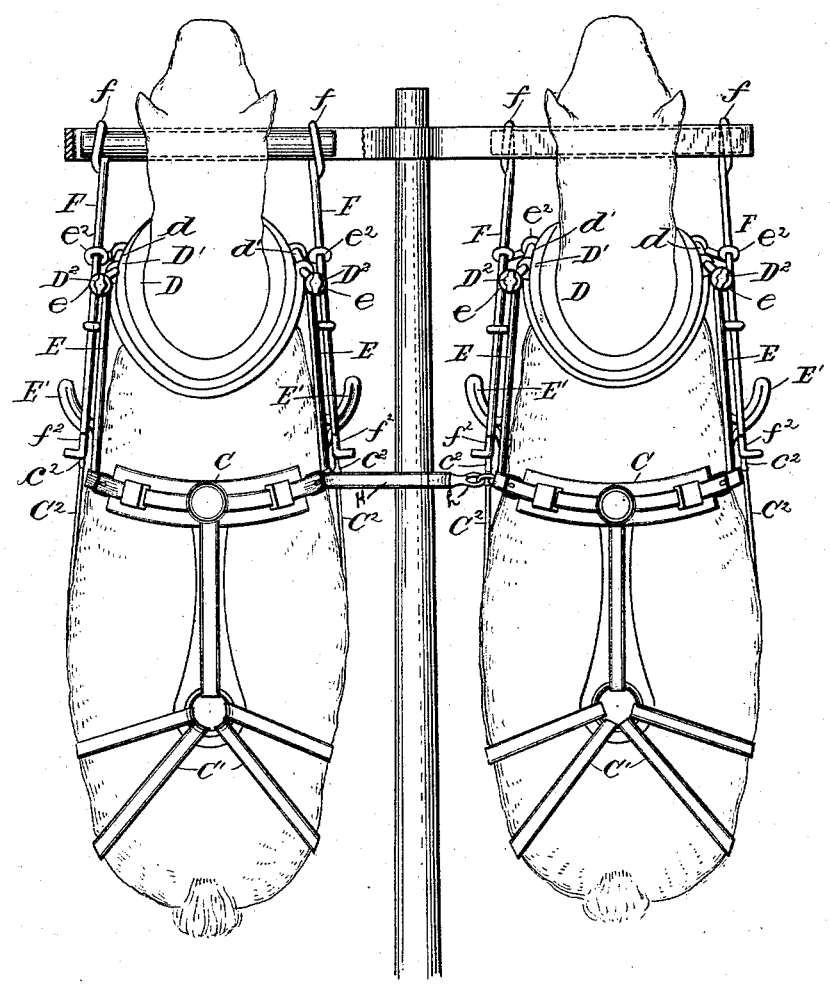

UNITED STATES PATENT OFFICE.

RICHARD CONDON, OF LYONS, IOWA.

HARNESS.

SPECIFICATION forming part of Letters Patent No. 485,258, dated November 1, 1892.

Application filed May 19, 1892. Serial No. 433,606. (No model.)

*To all whom it may concern:*

Be it known that I, RICHARD CONDON, a citizen of the United States, residing at Lyons, in the county of Clinton and State of Iowa, have invented certain new and useful Improvements in Harnesses; and I do hereby declare the following to be a full, clear, and exact description of the invention, such as will enable others skilled in the art to which it appertains to make and use the same.

This invention relates to a new and useful improvement in harnesses; and it consists in the construction and arrangements of parts hereinafter described, and definitely pointed out in the claims.

The object of this invention is to provide an improved harness by which the use of tug-straps is dispensed with, as well as many other important parts of the ordinary harness.

A further object of the invention is to construct and arrange the harness for draft or road animals which will avoid the necessity of approaching the rear of the animal for hitching or unhitching purposes, and with the application of which the animal or animals are enabled to be placed much nearer the load or vehicle than in the present form of harness.

A further object of the invention is to provide improved means for dispensing with the usual long singletrees and doubletrees, to prevent the danger of unhooking usually experienced with the present form of harness, overcoming the danger of accidental separation of the pole and neck-yoke, and finally producing a harness which is strong, durable, and cheaply manufactured.

In addition to the above-specified objects the construction of the harness is such that a more direct draft is obtained.

The objects are accomplished by the construction illustrated in the accompanying drawings, wherein like letters of reference indicate corresponding parts in the several views, and in which—

Figure 1 represents in dotted lines a horse with the harness thereon. Fig. 2 is a top plan view of a span of horses. Fig. 3 is a detail view of the collar, hame-tug, and draft-arm. Fig. 4 is a detail perspective of the hame-tug. Fig. 5 is a detached view of the neck-yoke and portions of the draft-arm.

In the drawings, A represents a wagon-pole having a neck-yoke B permanently attached thereto, in the opposite ends of which are pivoted singletrees B', the ends of which are cylindrical and on which are fitted the forward ends of the draft-arms, hereinafter referred to.

C is the saddle; C', the breeching to which the holdback $C^2$ is attached.

D represents the collar having the hames D' thereon, to which are adjustably secured clips $d$, formed with eyes $d'$. The hame-tugs E are hinged to the clips $d$ by having eyes formed on their ends, as at $e$, through which the pintle $D^2$ passes. The hame-tugs E are formed of metal having a horizontal lower bar $e'$, formed with two vertical eyes $e^2$ at or near its forward ends and an outwardly, forwardly, and upwardly extending hook E' at or near its rear end. The rear portion of the hame-tug is looped and passes through suitable loops on the saddle-strap and saddle, which tend to retain the rear end of the hame-tug in place. The upper end of the hame-tug is inclined upwardly, as shown.

The draft-arms are represented, as shown in the drawings, as being attached to the hame-tug, and they are of the following construction:

F is a bar of metal or other suitable material, preferably straight and having a curved eye formed thereon at its front end, as at $f$, the metal of the bar being continued back and down, constituting the lower bar F'. This bar is bent up into substantially an S shape, as shown at $f^2$, thereby constituting a hook. The bar F is passed through the eyes $e^2$ on the hame-tug, while the hook E' passes through the hook portion $f^2$. By this means the draft-arms are held in place, but may be readily removed by disengaging the hooks and withdrawing the bars F from the eyes $e^2$.

To retain the arms on the ends of the singletrees, a hook-bar G is pivotally secured on one of the arms and has formed on its free end a hook $g$, arranged to engage over the opposite arm, thereby preventing the outer ends of the arms from springing apart. This hook may be of any desired construction.

The forward end of the holdback-straps have suitable snaps $c^2$, which engage the lower loop of the S-shaped portion of the lower bar of the draft-arm. This snap may be of any desired construction.

To prevent the animals from moving or turning independently sidewise and to hold them in their proper position relative to the wagon, a suitable strap H, carrying a hook or snap $h$, is secured to the saddle-strap of one horse and extended over the tongue and engages a suitable loop on the harness of the other horse, as plainly shown in Fig. 2.

In operation the draft is brought directly on the tongue through the singletrees and draft-arms, which are attached to the singletrees located in the neck-yoke. The forward movement of the horse is transmitted by the rods to the tongue through the hook on the hame-tug, with which the draft-arms engage, thereby bringing the strain directly on the shoulders of the animals and avoiding the objections heretofore existing by the uses of traces or long tug-straps.

In backing the connection between the holdback and arms transfers the pressure or movement of the animal to the rear, as in the usual form of harness. In detaching the arms the holdback-snaps are disengaged from the arms, the arms are turned up and carried slightly forward, the bar F acting as a pivot. The arms are then drawn until the bar F is released from the eyes $e^2$.

To remove the hame-tugs, it is only necessary to remove the pintles $D^2$. This, however, is not necessary, as a rule.

By forming the hame-tugs with the two arms the hook is always held in its proper position.

The object in having the arms removable and slidingly engaging with the hame-tug is permit the horse or animal to approach a feeding-trough or manger. This is done by removing the hook portions of the arms from the hooks on the hame-tugs and forcing the arms back. It is also desirable to remove the arms entirely when the harness is being removed.

I am aware that many changes can be made in the construction and arrangements of parts and substituted for those herein described without in the least departing from the nature and principle of this invention.

Having thus described my invention, what I claim as new, and desire to secure by Letters Patent, is—

1. The combination, with a harness, of independent draft-arms, each consisting of parallel bars having eyes on their outer ends and engaging portions on their rear ends, hame-tugs on the harness formed with hooks with which said engaging portions engage, and eyes on the tugs for holding the arms in position, substantially as described.

2. The combination, with a harness, of a metallic hame-tug formed of two bars, eyes, and a hook on the lower bar, and a draft-arm consisting of two bars united and formed at their ends into an eye, the upper bar passing through the eye of the hame-tug and the lower bar formed with a hook engaging the hook of the tug, substantially as described.

3. The combination, with a harness, of hame-tugs on the harness, and removable sliding draft-arms independent of each other, pivotally secured on the hame-tugs, and hooks on the tugs for holding the arms in place, substantially as described.

4. In a harness, the combination, with longitudinally-movable and pivoted draft-arms extending forward, of engaging means on the ends of the draft-arms, and connections between the draft-arms and the holdback-straps of the harness, substantially as described.

5. The combination, with a harness, of removable tugs thereon formed of two united bars arranged at an angle to each other, eyes on the harness, eyes on the bars, pintles passing through the eyes, connections between the saddle-strap of the harness and hame-tugs, and slidable draft-arms on the tugs, substantially as described.

6. In a harness, the combination of forwardly-projecting draft-arms removably secured in the harness, connections between the draft-arms and holdback-straps of the harness, and a cross-over piece H for connecting the harness of adjacent animals, substantially as described.

7. In a harness, the combination, with hame-tugs formed with outwardly, forwardly, and upwardly extending hooks, of draft-arms pivoted to the tugs and formed with hooks engaging said other hooks, substantially as described.

8. The combination, with a harness, of hame-tugs on the harness, draft-arms slidingly and pivotally secured to the hame-tugs, and hooks on the tugs engaging the arms to prevent the rearward movement of the arms, substantially as described.

In testimony whereof I affix my signature in presence of two witnesses.

RICHARD CONDON.

Witnesses:
 ELIAM LUKENS,
 HERMAN S. KLARE.